United States Patent

Hiramatsu

[11] Patent Number: 5,487,563
[45] Date of Patent: Jan. 30, 1996

[54] PRETENSIONER FOR VEHICLE SEAT BELT SYSTEMS

[75] Inventor: Koji Hiramatsu, Shiga, Japan

[73] Assignee: Takata Corporation, Tokyo, Japan

[21] Appl. No.: 370,475

[22] Filed: Jan. 9, 1995

Related U.S. Application Data

[63] Continuation of Ser. No. 40,520, Mar. 31, 1993, abandoned.

[30] Foreign Application Priority Data

Apr. 6, 1992 [JP] Japan .................................. 4-112366

[51] Int. Cl.$^6$ .................................................. B60R 22/46
[52] U.S. Cl. ............................................ 280/806; 297/480
[58] Field of Search .................................... 280/806, 807; 297/476, 478, 480

[56] References Cited

U.S. PATENT DOCUMENTS

| | | | |
|---|---|---|---|
| 4,213,652 | 7/1980 | Irwin et al. | 280/806 |
| 4,473,242 | 9/1984 | Weman | 280/806 |
| 5,288,105 | 2/1994 | Ikegaya et al. | 280/806 |

FOREIGN PATENT DOCUMENTS

| | | | |
|---|---|---|---|
| 4032829 | 5/1991 | Germany | 280/806 |
| 61-241234 | 10/1986 | Japan . | |
| 1-119455 | 5/1989 | Japan . | |
| 1-164651 | 6/1989 | Japan . | |
| 2-256550 | 10/1990 | Japan . | |

*Primary Examiner*—Margaret A. Focarino
*Assistant Examiner*—Paul N. Dickson
*Attorney, Agent, or Firm*—Brumbaugh, Graves, Donohue & Raymond

[57] ABSTRACT

A pretensioner for vehicle seat belt systems comprises a belt-pulling member connected to a belt system component, a driving device for moving the belt-pulling member along a predetermined path in a direction to apply pretension to the belt, and a return-prevention device for preventing the belt-pulling member from moving in a direction such as to release the belt pretension. The return-prevention device includes a pawl coupled to the belt-pulling member, a support member having a set of ratchet teeth engageable by the pawl and a spring coupled to the pawl for biasing the pawl in a direction to engage it with a tooth of the set of ratchet teeth. The spring is a leaf spring having a base portion attached to the pawl and a tongue portion extending from the base portion and engageable with one of a series of ratchet teeth on the support member upon movement of the belt-pulling member and the pawl in the release direction. The spring tongue portion is arranged relative to the pawl and to the set of ratchet teeth that it engages such that when the pawl and leaf spring are displaced in the release direction, the tongue portion engages a ratchet tooth and is deformed and applies an increased force to the pawl.

4 Claims, 6 Drawing Sheets

PRETENSIONER FOR VEHICLE SEAT BELT SYSTEMS

This application is a continuation of application Ser. No. 08/040,520, filed on Mar. 31, 1993 now abandoned.

BACKGROUND OF THE INVENTION

The present invention relates to a pretensioner for vehicle seat belt systems, and in particular to a pretensioner having a return-prevention device for preventing the seat belt from losing part of its pretension after the pretensioner has operated.

In some seat belt systems used in vehicles such as automobiles, a pretensioner is provided for preventing movement of the body of an occupant through tightening of the belt when excessive acceleration acts on the vehicle and thereby providing greater restraint of the occupant. Pretensioners often have a return-prevention device for maintaining the tension applied to the belt by the pretensioner. Examples of pretensioners having return-prevention devices are found in Japanese Laid-open Patent Publications Nos. 61-241234, 1-119455, 1-164651, and 2-256550. All of those publications describe and show return-prevention devices in which a pawl associated with a belt-pulling member to which the belt is coupled is biased by a pawl spring in a direction to engage one-way (ratchet) locking teeth in the form of a rack. The spring urges the pawl into engagement with a tooth of the rack when the belt-pulling member starts to move in a direction that would allow the release of some of the tension in the belt. The engagement of the pawl with a ratchet tooth stops the belt-pulling member from moving further in a tension-releasing direction.

Seat belt pretensioners are required to operate very rapidly in order to tighten the belt before the occupant begins to move forward by the inertia imposed on him or her by the rapid vehicle acceleration (negative acceleration). Likewise, the pawl of a return-prevention device must engage a ratchet tooth in a very short time, lest a part of the pretension be lost by movement of the belt-pulling member in a direction that allows the belt to loosen. The movement of the pawl into engagement with a ratchet tooth of the rack requires that the inertia of the pawl be overcome. Hence, it would be desirable to provide a pawl having a low mass. Unfortunately, it is not feasible to reduce the mass of the pawl without also reducing its strength. The need for the pawl to be strong enough to support the load applied to the belt by the occupant places a lower limit on the mass of the pawl.

SUMMARY OF THE INVENTION

To solve the above problems, it is an object of the present invention to provide a pretensioner having a return-prevention device, the pawl of which has the strength necessary to support the belt load and is thus of a relatively large mass, and which operates rapidly and reliably despite the large mass of the pawl.

The foregoing object is attained, according to the present invention, by a pretensioner for vehicle seat belt systems that comprises a belt-pulling member connected to a belt system component, a driving device for moving the belt-pulling member along a predetermined path in a direction to apply pretension to the belt, and a return-prevention device for preventing the belt-pulling member from moving in a direction such as to release the belt pretension. The return-prevention device includes a pawl coupled to the belt-pulling member, a support member having a set of ratchet teeth engageable by the pawl and a spring coupled to the pawl for biasing the pawl in a direction to engage it with a tooth of the set of ratchet teeth. The invention is characterized in that the spring is a leaf spring having a base portion attached to the pawl and a tongue portion extending from the base portion and engageable with one of a series of ratchet teeth on the support member upon movement of the belt-pulling member and the pawl in the release direction. The spring tongue portion is arranged relative to the pawl and to the set of ratchet teeth that it engages such that when the pawl and leaf spring are displaced in the release direction, the tongue portion engages a ratchet tooth and is deformed and applies an increased force to the pawl.

In one embodiment, the spring tongue portion engages the same set of ratchet teeth as the pawl engages. In particular, the tongue portion extends from a portion of the pawl spaced apart from the pawl tip and engages a different tooth of the set from the tooth engaged by the pawl tip upon displacement of the pawl and spring in the release direction.

In another embodiment, the spring tongue portion engages a set of ratchet teeth separate from the ratchet teeth that the pawl engages. The tongue portion extends from a portion of the pawl adjacent the pawl tip and the tip of the tongue portion extends from the base portion in generally the same direction as but divergently from the direction in which the pawl tip extends from the spring base portion.

A pretensioner embodying the present invention provides for very rapid movement of the pawl into locking engagement with the ratchet because of the increased force applied to it by the spring upon deformation of the spring after it engages a ratchet tooth. After the pretensioner operates to apply pretension to the belt and the belt-pulling member is moved slightly in the release direction by the belt force due to a small movement of the occupant by inertia, the tongue portion of the spring becomes engaged with a tooth of a set of ratchet teeth and then is deformed so as to exert an increased force on the pawl in a direction to engage the tip of the pawl with a tooth of a set of ratchet teeth. Accordingly, the pawl becomes engaged very quickly with a minimum amount of displacement in the release direction and without jumping or missing a tooth, and the amount of pretension in the belt imparted by the driving device of the pretensioner is not significantly reduced.

For a better understanding of the invention, reference may be made to the following description of exemplary embodiments, taken in conjunction with the accompanying drawings.

DESCRIPTION OF THE EMBODIMENTS

Figure 1:
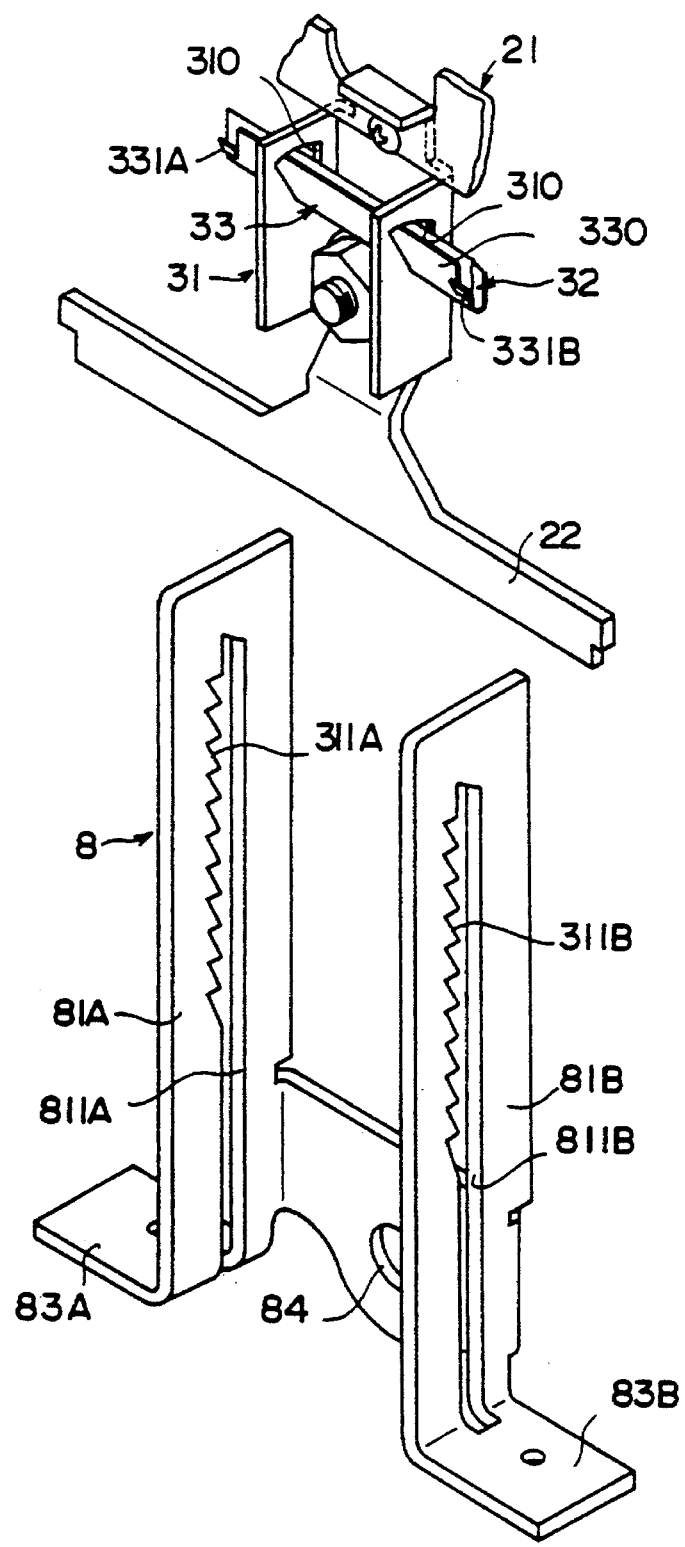
FIG. 1 is an exploded perspective view of some of the components of a first embodiment of the invention, as applied to a pretensioner that acts on a buckle.

In the embodiment of FIGS. 1 to 4, the pretensioner, which is a buckle pretensioner, comprises axially-acting driving means 1, belt-pulling means 2, return-prevention means 3, starting means 4, a bracket 8 for attaching the driving means 1 and the return-prevention means 3 to a vehicle, and a cover 9. The pretensioner is designed such that a belt 6 connected to the operating ends 112 of the driving means 1 by the belt-pulling means 2 is pulled in by the driving means. The driving means 1 comprises a pair of axially-acting driving devices 1A and 1B arranged in tandem with each other with a space between them. The belt-pulling means 2 is connected to the operating ends 112A and 112B of the axially-acting driving devices 1A and 1B, respectively, and moves into the space between the driving devices 1A and 1B when the pretensioner is operated.

As best seen in FIG. 1, the pretensioner is mounted on the buckle bracket 8, which is provided with a pair of front and rear elongated walls 81A and 81B facing each other with a space S (FIG. 2, a space for receiving the buckle 21 in the present example) between them, a cross piece 82 for connecting the walls 81A and 81B in its lower portion, and bottom feet 83A and 83B extending outwardly forward and backward from the lower ends of the walls 81A and 81B, respectively. On the two walls 81A and 81B, slits 811A and 811B are formed, respectively, almost over their entire lengths. A bolt hole 84 for affixing the bracket to the car body is provided on the side wall 82.

Referring once again to FIG. 2, the axially-acting driving means 1A and 1B comprise, in the embodiment, compression coil springs 11A and 11B, and cylindrical spring guide tubes 12A and 12B for accommodating the springs and having a pair of axial slits 121A and 121B at their lower portions. The upper base ends 111A and 111B of the springs 11A and 11B engage and are supported by spring seats 122A and 122B at the upper ends of the spring guide tubes 12A and 12B. The lower operating ends 112A and 112B engage and are supported by a spring stopper 22, which constitutes a part of the connecting means 2, through spring seats 123A and 123B. The spring guide tube 12A is located in front of the wall 81A of the bracket 8, the spring guide tube 12B is arranged in the rear of the wall 81B, the upper ends of the guide tubes are supported by the upper wall of the cover 9, and their lower ends are supported by the bottom feet 83A and 83B of the buckle bracket 8.

The belt-pulling means 2 includes a buckle 21 in the embodiment. As an auxiliary means for connecting the buckle 21 to the belt 6 and the axially driving means 1A and 1B, a tongue 5 slidably mounted on the belt 6 and a part of return-prevention means 3 as described below are provided in addition to the spring stopper 22. The buckle 21 and the tongue 5 are of a commonly known design, and a detailed description is not required or given here.

The spring stopper 22 comprises an upper connection arm 221 extending upwardly from its central portion and is rotatably connected to the buckle 21. It is a plate of inverted T-shape, which has a front arm 222 and a rear arm 223 extending horizontally in the forward and backward directions, respectively. On these two arms 222 and 223, the operating ends of the main springs 11A and 11B are abutted and supported through the spring seats 123A and 123B. On the outer lower ends of the two arms 222 and 223, notches 224 and 225 are formed, respectively. The upper end of the upper connection arm 221 of the spring stopper 22 is rotatably fixed by a bolt on a pawl holder 31 of the return-prevention means 3, and the front arm 222 and the rear arm 223 protrude in the front and the rear of the spring guide tubes 12A and 12B through slits 811A and 811B in the buckle bracket 8 and axial slits 121A and 121B of the spring guide tubes.

As shown in FIG. 1, the return-prevention means 3 comprises ratchet teeth 311A and 311B formed on the edges of the slits 811A and 811B of the longitudinal walls 81A and 81B of the buckle bracket 8 inside the spring guide tubes 12A and 12B, an elongated plate-like pawl 32 horizontally positioned and movably supported on a pawl holder 31, and a pawl spring 33 (described below) attached to the pawl 32. The pawl holder 31 is in the form of a channel and has a bent upper wall that is engaged with a fitting on the buckle 21 and fastened to it. Fan-shaped pawl-supporting holes 310 are formed on the side walls. The pawl 32, along with the spring 33, is received in the pawl-supporting holes 310 and with its lower edge supported by the lower edges of the holes, it is positioned in such a manner that its tip can rock toward and away from the ratchet teeth 311A and 311B.

The pawl spring 33 has a U-shaped base portion that is received on the pawl with the loop of the "U" at the lower edge of the pawl. Each end of the spring 33 is slit, and a tongue portion 331A and 331B at each end, respectively, is bent out with respect to the surface of the pawl such that its tip extends generally out into a space between the ratchet teeth 311A and 311B. In the set condition of the pretensioner, the pawl rests in an upright position in the holes 310 under the bias of the tongue portions 331A and 311B of the spring.

Figure 2:
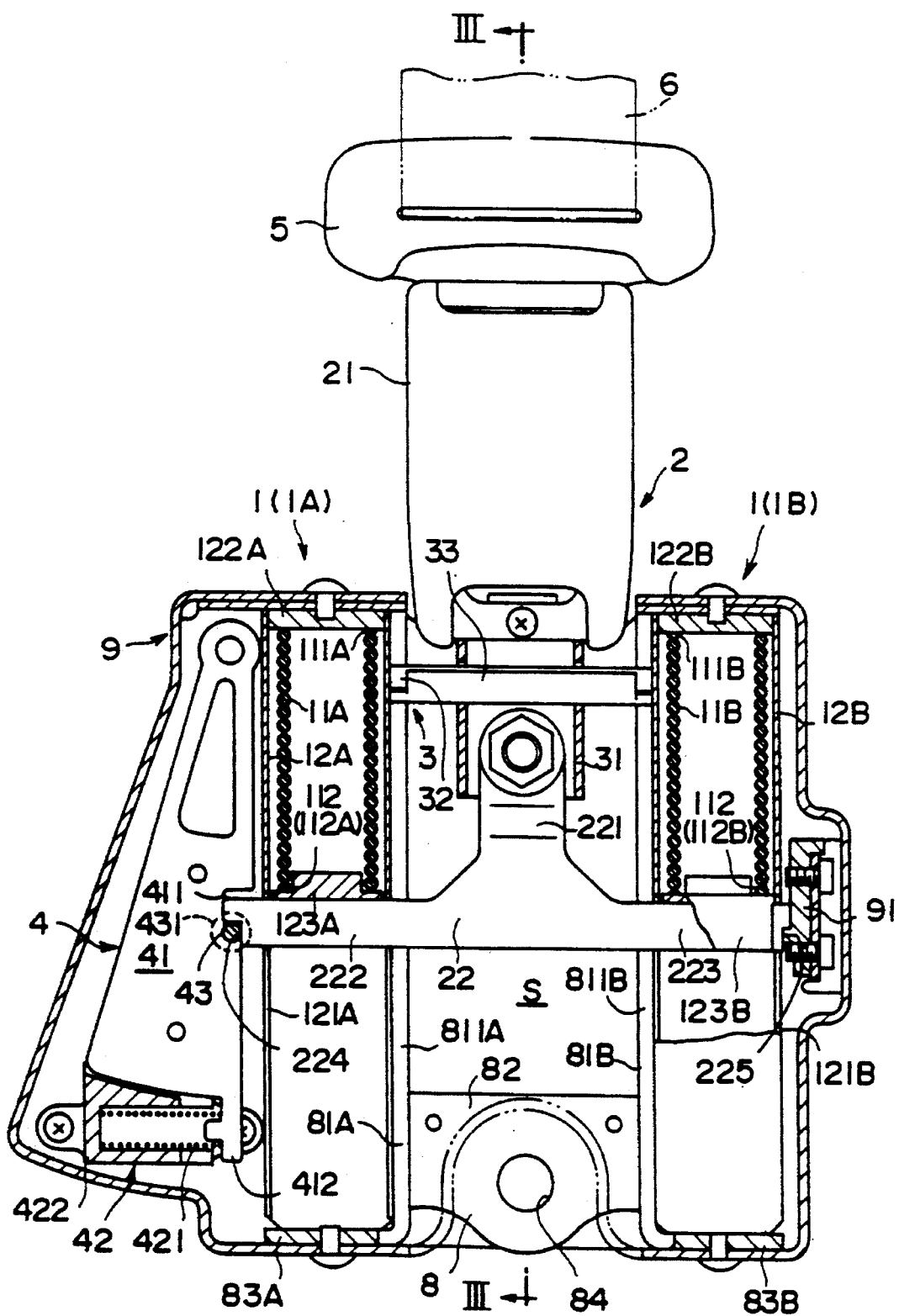
FIG. 2 is a side elevational view of the first embodiment, with portions broken away in cross-section.

As shown in FIG. 2, the starting means 4 comprises a fan-shaped weight 41, the upper end of which is supported on the cover 9 by a pin so that it can pivot back and forth, and biasing means 42 (e.g., a spring) for holding and pushing the weight to the "set" position. The starting means is arranged in front of the spring guide tube 12A within the cover 9. The weight 41 is provided with a recess 411 formed at the center of its rear edge and with a projection 412 extending downward. A roller 43 is supported by the recess 411, and the end of the spring stopper 22 is squeezed by collars 431 on both sides of the roller 43. The weight 41 and the spring stopper 22 are engaged with each other through the roller 43. The projection 412 is abutted by the operating end of a set spring 421 of the pushing means 42, and the base end of the set spring 421 is inserted into a spring seat block 422 and is supported by it. Facing toward the recess 411 is a sub-pawl 91 that is fastened by screws to the cover 9 to the rear of the spring guide tube 12B. This constitutes a stopper for supporting the end of the spring stopper 22 opposite from the starting means in the set position.

FIG. 2 shows the pretensioner in the set condition. The notch 224 on the stopper is supported by the weight 41 through the roller 43, and the notch 225 is supported by the sub-pawl 91. The springs 11A and 11B are held in the set condition with maximum compression. In this condition, the buckle 21 is at the uppermost position, and the buckle tongue 5 permits the belt 6, which passes through it, to run loosely along the body of the occupant.

The operation of the pretensioner is as follows. When an acceleration higher than a predetermined value is applied to the vehicle and is detected by the weight 41, which serves as a sensor, the weight compresses the set spring 421 by inertial force and rotates clockwise in the figure. By this rotation of the weight 41, the roller 43 starts rolling and is separated from the notch 224 of the spring stopper. Having lost the support on the side acted on by the main driving spring 11A, the spring stopper 22 is slightly tilted around the supporting point on the sub-pawl 91 by the resilient force of the spring 11A. It is then separated from the supporting point and is pushed quickly downward from the starting position shown in FIG. 4A by the force of the two springs 11A and 11B.

Figure 3:
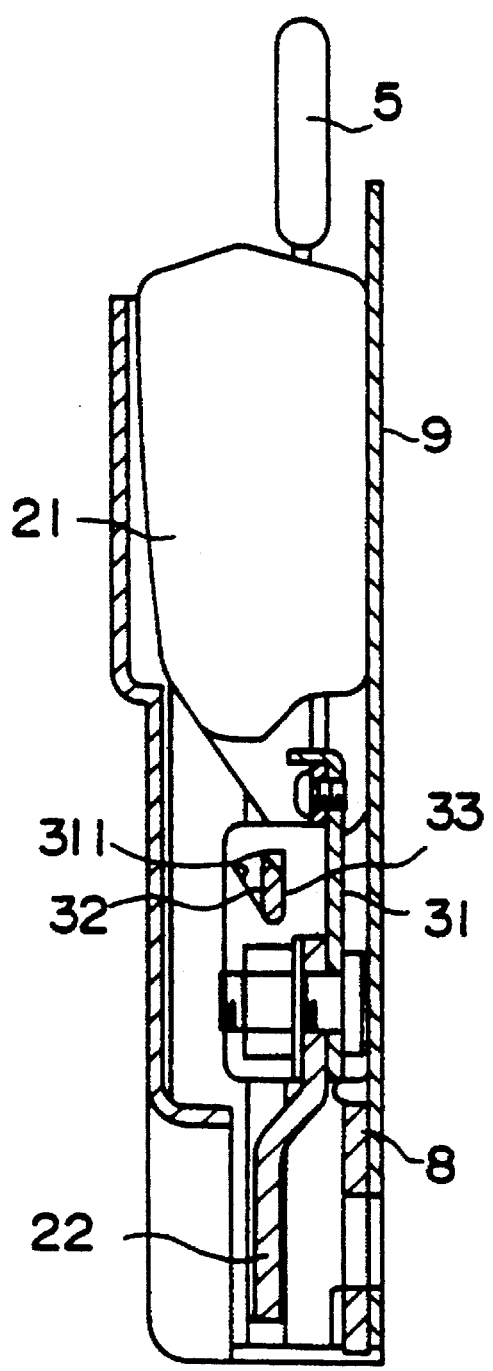
FIG. 3 is a cross-sectional view taken along the line III—III of FIG. 2 and shows the state after the pretensioner has operated but before the return-prevention device has become engaged.
Figure 4A:
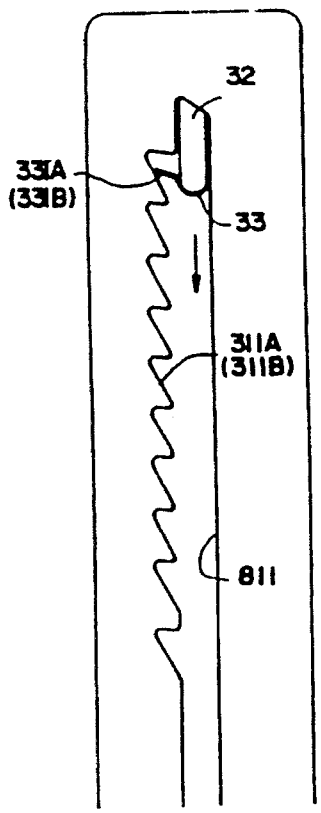
FIGS. 4A–4E show schematically and sequentially the manner in which the pawl and leaf spring of the return-prevention device of the first embodiment operate.
Figure 4B:
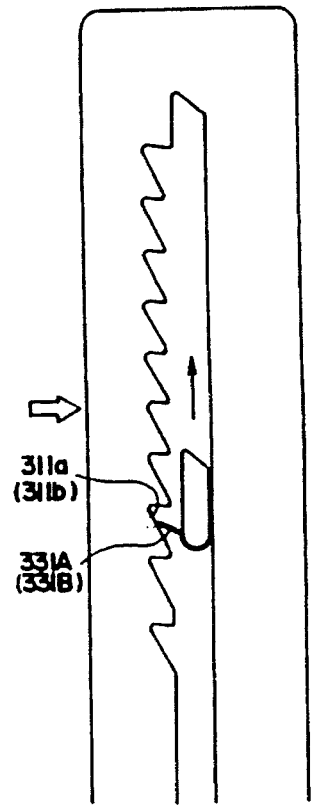

By this operation, the buckle 21 connected to the spring stopper 22 is pulled into the space S within the cover 9 accompanied by the tongue 5 and the pawl holder 31. The pawl 32 moves down to the lowermost position, as shown in FIG. 4B. As the pawl moves down, it remains in the upright position. Meanwhile, the tongue portions 331A and 311B of the pawl spring 33 are repeatedly pushed out by the one-way ratcheting action of the ratchet teeth 311A and 311B of the buckle bracket 8. When the belt-pulling means reaches the end of its stroke in a direction to pretension the seat belt, the spring stopper 22 hits the bottom feet 83A and 83B of the bracket 8 and stops, as shown in FIG. 3.

Figure 4C:
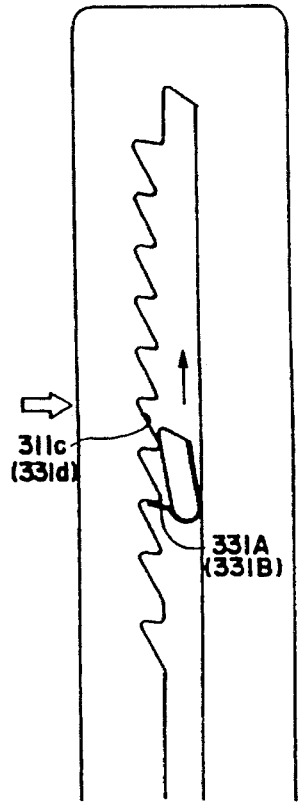
Figure 4D:
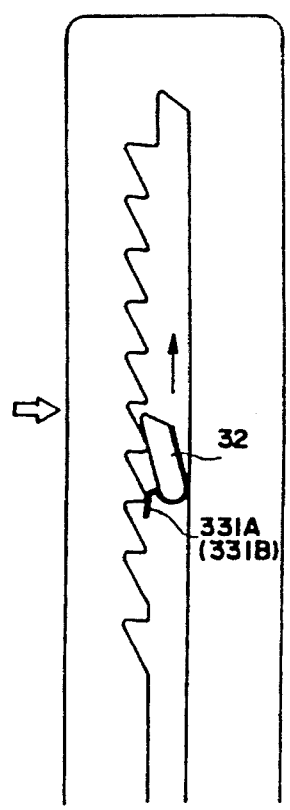
Figure 4E:
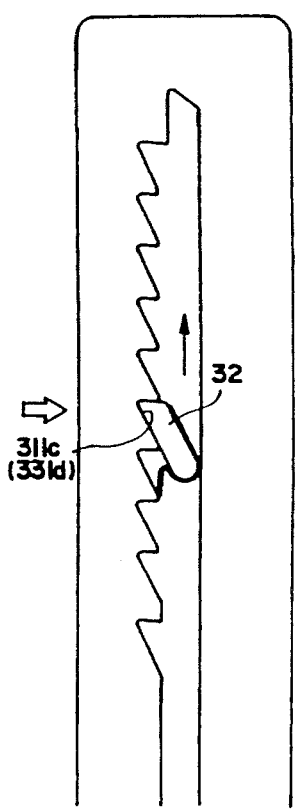

After the belt-pulling means is no longer subject to a driving force in a direction to apply more tension to the belt, the inertia of the seat occupant applies a force to the belt that begins to move the pulling means in a direction releasing the pretension. When this happens, the tongue portions 311A and 311B extend into a spaces 311A and 311B between ratchet teeth (FIG. 4B) and immediately engage ratchet teeth (FIG. 4C). Having been stopped in engagement with the ratchet teeth, an additional small movement of the belt-pulling means moves the pawl 32 upwardly, which results in deformation of the tongue portions, which are bent back as shown in FIG. 4D. That deformation results in the development of a spring force exerted on the back of the pawl, which acts in a direction to pivot the pawl counterclockwise (with respect to the drawing figures) in the holes 310 into engagement with teeth 311C and 311D (FIG. 4E). The engagement of the pawl 32 with the ratchet teeth 311C and 311D stops the movement of the belt-pulling means in the release direction tending to reduce the pretension. Thus, loosening of the belt 6 after the pulling operation is prevented, and the pretension imparted to the belt is maintained.

The present invention ensures rapid engagement of the pawl with ratchet teeth that stop the return movement of the belt-pulling means in a direction tending to release some of the belt pretension. The inertia of the pawl is overcome by the force of a spring that increases by deformation of the spring. The spring force moving the pawl into locking engagement with the ratchet teeth increases as the pawl pivots toward engagement, which is the opposite of the condition of prior art pawl spring arrangements, in which the spring force diminishes as the pawl moves in the same direction as the operating end of the spring.

Figure 5:
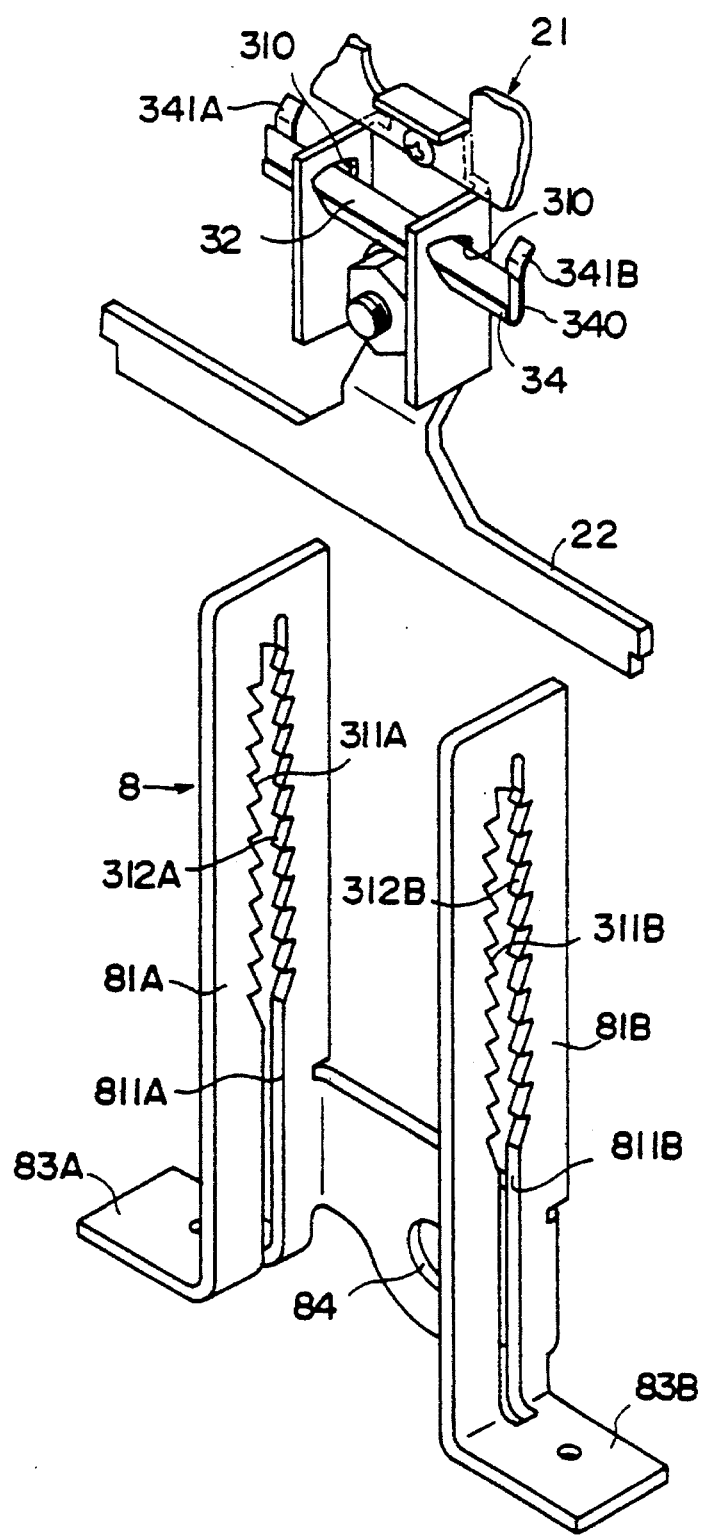
FIG. 5 is an exploded perspective view of some of the components of a second embodiment of a return-prevention device according to the present invention.

The second embodiment, shown in FIGS. 5 and 6, is substantially the same as the first embodiment of the invention, except for the arrangement of the pawl spring and the ratchet teeth that the pawl spring works with. Accordingly, the corresponding components are designated by the same reference symbols as in the first embodiment.

The second embodiment has a separate row or rack of ratchet teeth 312A and 312B in the respective walls 81A and 81B of the bracket 8. The teeth are on the opposite edge of the slits 811A and 811B from the ratchet teeth that are engaged by the pawl 32. The pawl spring 34 has a U-shaped base portion 340 and a pair of tongues 341A and 341B that project from the base portion in generally the same direction as the tip of the pawl but also divergently with respect to the pawl such that they protrude slightly into the spaces between the teeth 312A and 312B (see FIGS. 6A and 6B).

Figure 6A:
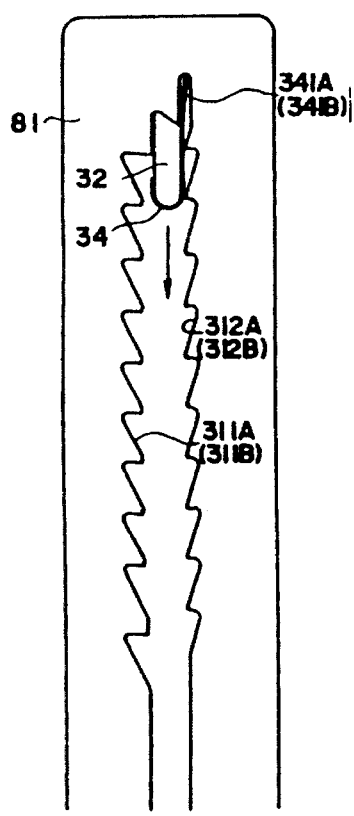
FIG. 6A–6E show schematically and sequentially the manner in which the pawl and leaf spring of the return-prevention device of the second embodiment operate.
Figure 6B:
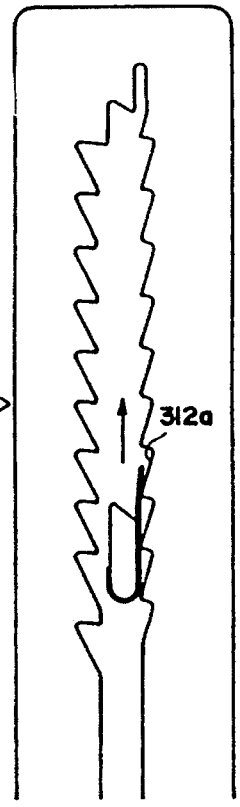
Figure 6C:
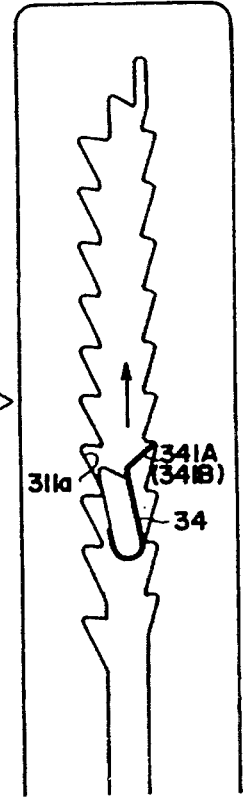
Figure 6D:
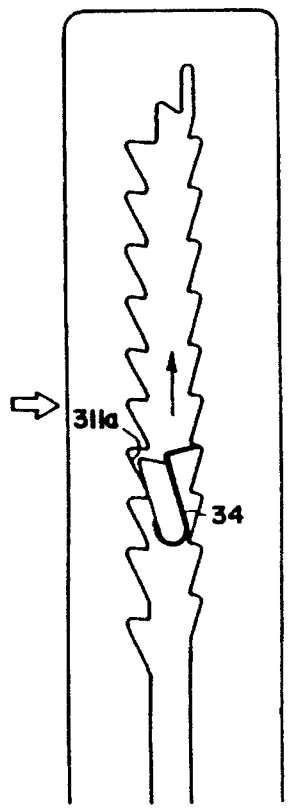
Figure 6E:
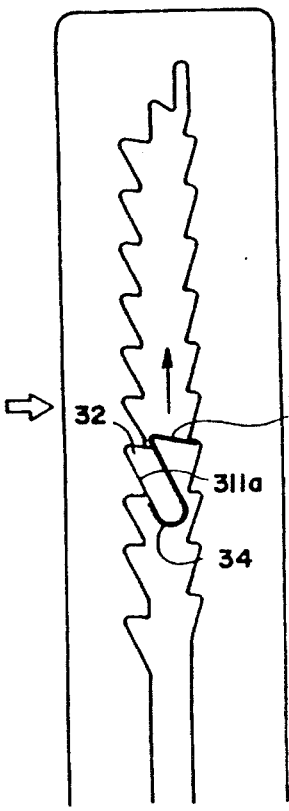

When the belt-pulling means is released from the set condition and pushed down by the driving springs, the pawl 32 and spring 34 move down in the slits 81A and 81B, the tongue portions 341A and 341B being deflected by the ratchet teeth 312A and 312B in a one-way ratcheting action as the pawl and spring move down to the stop position shown in FIG. 6B. The large forces between the tip of the pawl 32 and the upper edges of the holes 310 keeps the pawl from pivoting under the relatively smaller force of the tongue portions of the spring 34 as it ratchets down along the slits. When a return force is applied to the belt-pulling mechanism and it moves upwardly, the tips of the tongue portions 341A and 341B engage ratchet teeth 312*a* (and 312*b*, FIG. 6C). Additional upward displacement deforms the spring tongue portions, and the increased spring forces resulting from that deformation pushes the pawl 32 into engagement with ratchet teeth 311*a* (and 311*b*, FIGS. 6D and 6E). The operation of the second embodiment is thus similar to that of the first embodiment, except that in the second embodiment the spring forces acting on the pawl are compressive, whereas in the first embodiment, the spring forces are tensile.

The embodiments are intended to be exemplary, and whereas they provide for pulling in the buckle, the present invention is not limited to the above embodiment and can be applied to any part of a seat belt system. The specific arrangements of the components can, therefore, be modified within the scope of the claim attached hereto.

I claim:

1. A pretensioner for a vehicle seat belt system having belt-pulling means connected to a belt system component, driving means for moving the belt-pulling means along a predetermined path in a direction to apply pretension to the belt, and return-prevention means for preventing the belt-pulling means from moving in a direction such as to release the belt pretension and including a pawl coupled to the belt-pulling means, a support member having a set of ratchet teeth engageable by a tip of the pawl and a spring coupled to the pawl for biasing the pawl in a direction to engage the pawl tip with a tooth of the set of ratchet teeth, characterized in that the spring is a leaf spring that is U-shaped and includes a pair of leg portions and a base portion forming a loop connecting the leg portions and is received on the pawl with the base portion engaging the lower edge of the pawl and the leg portions engaging opposite surfaces of the pawl and an elastically deformable tongue portion extending from one of said portions of the leaf spring and engageable with one of a series of ratchet teeth on the support member upon movement of the belt-pulling means and the pawl in the release direction, the spring tongue portion being arranged relative to the pawl and to the set of ratchet teeth such that when the pawl and leaf spring are displaced in the release direction, the tongue portion engages a ratchet tooth and is deformed and bent back and applies an increased force to the pawl urging the pawl into engagement with a tooth of the set of ratchet teeth.

2. A pretensioner according to claim 1 and further characterized in that the spring tongue portion engages the same set of ratchet teeth as the pawl engages, the tongue portion extending from a portion of the pawl spaced apart from the pawl tip and engaging a different tooth of the set from the tooth engaged by the pawl tip.

3. A pretensioner according to claim 1 and further characterized in that the spring tongue portion engages a set of ratchet teeth separate from the ratchet teeth that the pawl engages.

4. A pretensioner according to claim 3 and further characterized in that the tongue portion extends from a portion of the pawl adjacent the pawl tip and the tongue portion has a tip that extends from the base portion in generally the same direction as but divergently from the direction in which the pawl tip extends from the spring base portion.

* * * * *